US012563097B2

(12) United States Patent
Bransi et al.

(10) Patent No.: US 12,563,097 B2
(45) Date of Patent: Feb. 24, 2026

(54) SYSTEMS AND METHODS FOR TAG-BASED POLICY ENFORCEMENT FOR DYNAMIC CLOUD WORKLOADS

(71) Applicant: Zscaler, Inc., San Jose, CA (US)

(72) Inventors: Charles Bransi, Palo Alto, CA (US); Praveen Yadothare, Sunnyvale, CA (US); Siva Yarlagadda, San Jose, CA (US); Vladimir Stepanenko, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 108 days.

(21) Appl. No.: 18/413,364

(22) Filed: Jan. 16, 2024

(65) Prior Publication Data

US 2025/0233888 A1      Jul. 17, 2025

(51) Int. Cl.
*H04L 29/06* (2006.01)
*H04L 9/40* (2022.01)
*G06F 16/958* (2019.01)

(52) U.S. Cl.
CPC ............ *H04L 63/20* (2013.01); *G06F 16/958* (2019.01)

(58) Field of Classification Search
CPC ....... H04L 63/20; H04L 63/10; H04L 63/108; H04L 63/0263; H04L 63/04; G06F 16/958
See application file for complete search history.

(56) References Cited

U.S. PATENT DOCUMENTS

| | | | |
|---|---|---|---|
| 8,687,653 B2 | 4/2014 | Bransi et al. | |
| 9,853,906 B2 * | 12/2017 | Atkins | ................. H04L 47/125 |
| 10,432,651 B2 | 10/2019 | Pangeni et al. | |
| 10,965,716 B2 | 3/2021 | Walter et al. | |
| 11,153,190 B1 | 10/2021 | Mahajan et al. | |
| 11,159,486 B2 | 10/2021 | Pangeni et al. | |
| 11,582,192 B2 | 2/2023 | Devarajan et al. | |
| 11,637,766 B2 | 4/2023 | Devarajan et al. | |
| 11,665,139 B2 | 5/2023 | McDowall et al. | |
| 11,770,319 B2 | 9/2023 | Kamath et al. | |
| 2020/0259792 A1 | 8/2020 | Devarajan et al. | |
| 2023/0084011 A1 | 3/2023 | Bransi et al. | |

* cited by examiner

*Primary Examiner* — Longbit Chai
(74) *Attorney, Agent, or Firm* — Baratta Law PLLC; Lawrence A. Baratta, Jr.; Ryan Odessa

(57) ABSTRACT

Systems and methods for enforcing tag-based policy on dynamic workloads include monitoring, via a cloud-based system, traffic associated with one or more customers of the cloud-based system; receiving a packet from a workload associated with a customer of the one or more customers; performing a tag lookup at one or more nodes of the cloud-based system based on the packet; enforcing one or more policies based on the tag lookup. Based on no tags being found for the workload during the tag lookup at the one or more nodes, the nodes are adapted to drop the packet; query the one or more cloud connectors for workload information; and receive, in a next packet, all tags and a version associated with the workload.

16 Claims, 8 Drawing Sheets

700

700

MONITORING, VIA A CLOUD-BASED SYSTEM, TRAFFIC ASSOCIATED WITH ONE OR MORE CUSTOMERS OF THE CLOUD-BASED SYSTEM — 702

RECEIVING A PACKET FROM A WORKLOAD ASSOCIATED WITH A CUSTOMER OF THE ONE OR MORE CUSTOMERS — 704

PERFORMING A TAG LOOKUP AT ONE OR MORE NODES OF THE CLOUD-BASED SYSTEM BASED ON THE PACKET — 706

ENFORCING ONE OR MORE POLICIES BASED ON THE TAG LOOKUP — 708

SYSTEMS AND METHODS FOR TAG-BASED POLICY ENFORCEMENT FOR DYNAMIC CLOUD WORKLOADS

FIELD OF THE DISCLOSURE

The present disclosure generally relates to computer networking systems and methods, particularly focused on cloud policy enforcement. More particularly, the present disclosure relates to systems and methods for tag-based policy enforcement for dynamic cloud workloads.

BACKGROUND OF THE DISCLOSURE

Today's cloud environments are extremely dynamic in nature. Resource instances are continuously spun up and down depending on various needs. These needs range from auto scaling, load balancing, etc. Traditional methods of identifying these dynamic workloads for policy enforcement include sending workload information within each packet transmitted between computing components. These methods introduce large amounts of latency because of the constant need to identify workloads within traffic. Because of this, these methods do not scale well within large cloud environments with large amounts of dynamic workloads. The present disclosure introduces systems and methods for tag-based policy enforcement for dynamic cloud workloads, which do not require tag information to be constantly sent between components. The systems and methods do not reduce latency and do not affect Maximum Transmission Unit (MTU) size negotiated in Transmission Control Protocol (TCP) handshakes.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include monitoring, via a cloud-based system, traffic associated with one or more customers of the cloud-based system; receiving a packet from a workload associated with a customer of the one or more customers; performing a tag lookup at one or more nodes of the cloud-based system based on the packet; enforcing one or more policies based on the tag lookup.

The steps can further include performing a policy lookup based on tags discovered during the tag lookup, wherein the enforcing is performed based thereon. The tag lookup, the policy lookup, and the enforcing can be performed at the one or more nodes of the cloud-based system. The steps can further include discovering all tags associated with all workloads of the customer. The steps can further include synchronizing discovered tags with one or more cloud connectors of the cloud-based system, wherein the one or more cloud connectors are communicatively coupled to the one or more nodes of the cloud-based system. Based on no tags being found for the workload during the tag lookup at the one or more nodes, the steps can further include: dropping the packet; querying the one or more cloud connectors for workload information; and receiving, in a next packet, all tags and a version associated with the workload. The steps can further include storing the received tags and version associated with the workload at the one or more nodes. The tags and version associated with the workload nodes. The tags and version associated with the workload can be received from the one or more cloud connectors via transmission of a Transmission Control Protocol (TCP)

Synchronization (SYN) packet. Responsive to identifying a modification of one or more tags of the workload, the steps can further include updating a database and a version of the workload based thereon. Based on identifying a new version number of the workload during the tag lookup at the one or more nodes, the steps can further include: dropping the packet; querying the one or more cloud connectors for new workload information; and receiving, in a next packet, all tags and the new version associated with the workload.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

DETAILED DESCRIPTION OF THE DISCLOSURE

Again, the present disclosure relates to systems and methods for tag-based policy enforcement for dynamic cloud resources. Today's cloud environments are extremely dynamic in nature. Resource instances are continuously spun up and down depending on various needs. These needs range from auto scaling, load balancing, etc. The present systems allow dynamic resources to be assigned policy based on their tags in a more efficient way that currently implemented. The tag-based policy enforcement of the present disclosure includes querying a database for resource tags responsive to the resource associated with traffic being new. This streamlines resource identification and policy enforcement by persisting tags and IDs of resources at cloud nodes. Responsive to new resources being initiated, cloud connectors can be adapted to send tags and tag versions to nodes for policy identification and enforcement.

Cloud-based security solutions have emerged, such as Zscaler Internet Access (ZIA) and Zscaler Private Access (ZPA), available from Zscaler, Inc., the applicant and assignee of the present application. ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
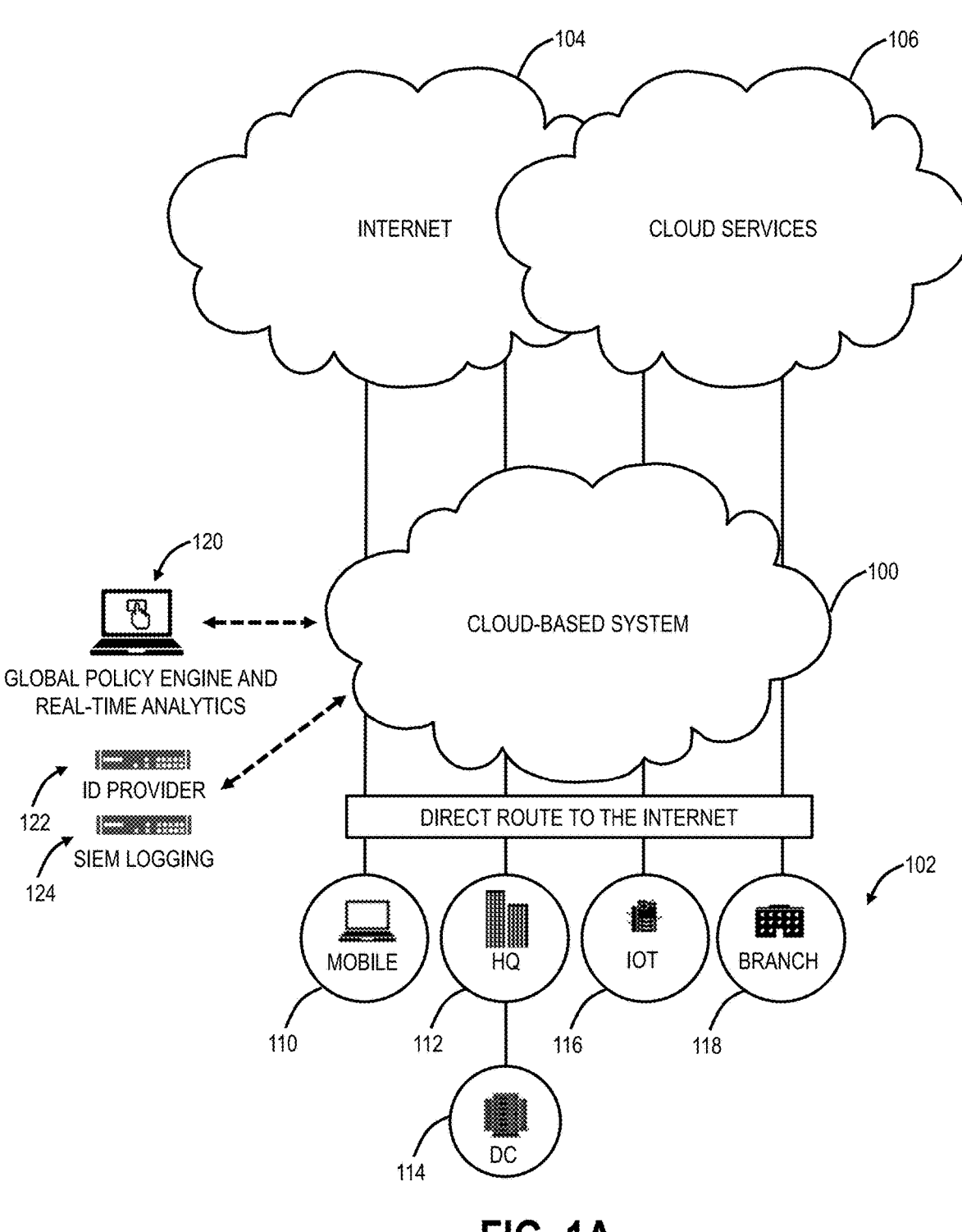
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 4:
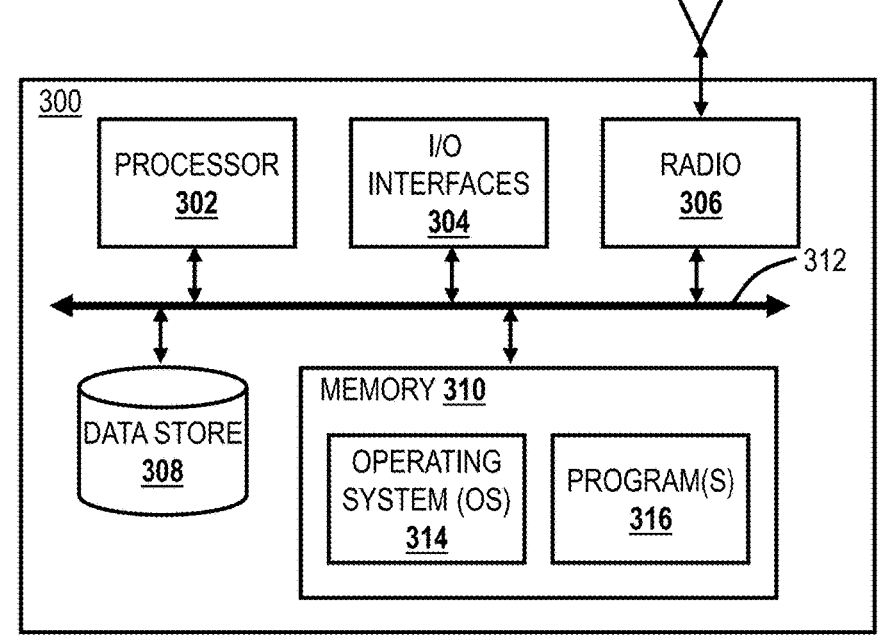

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 4). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
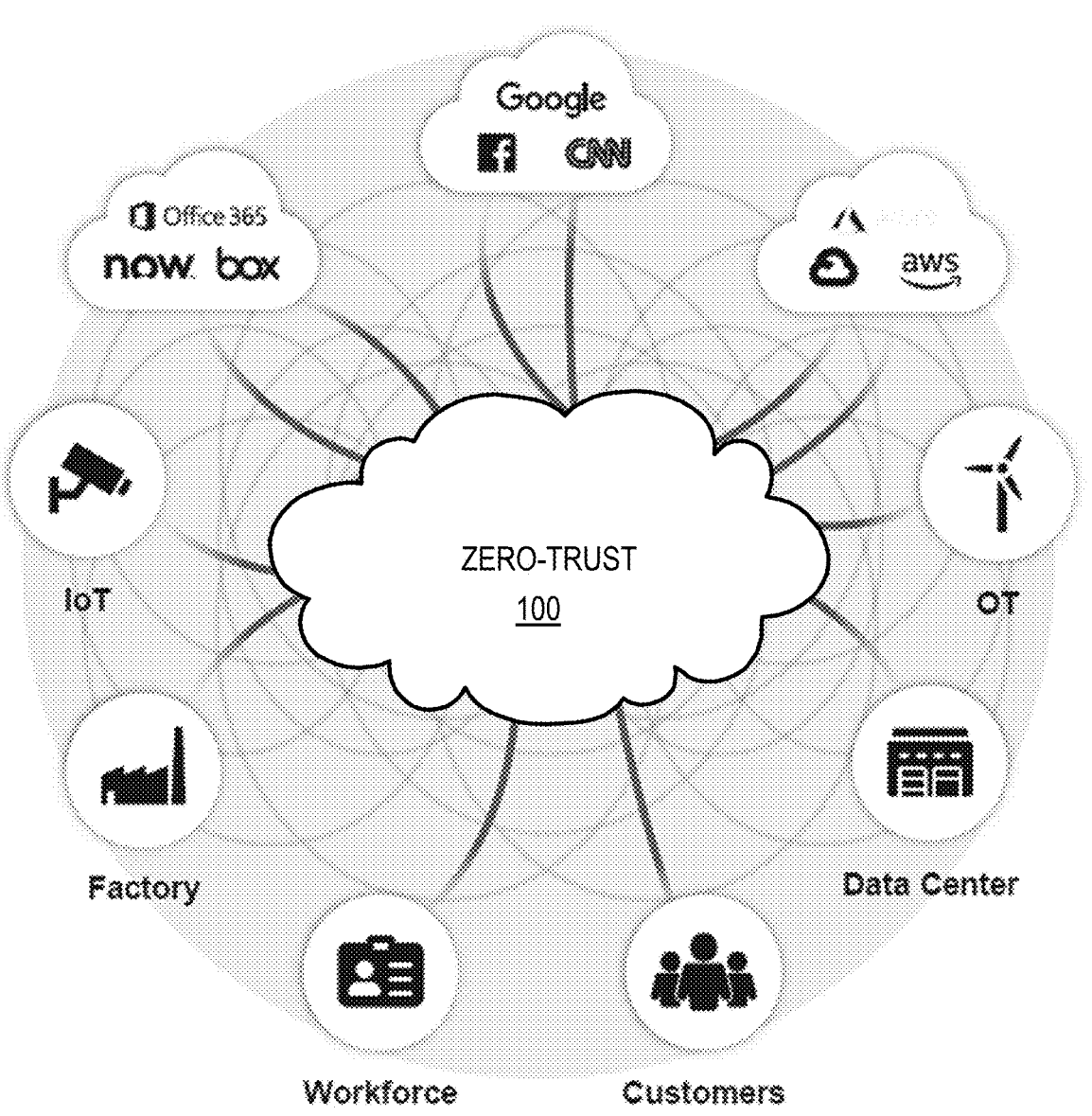
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multifactor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
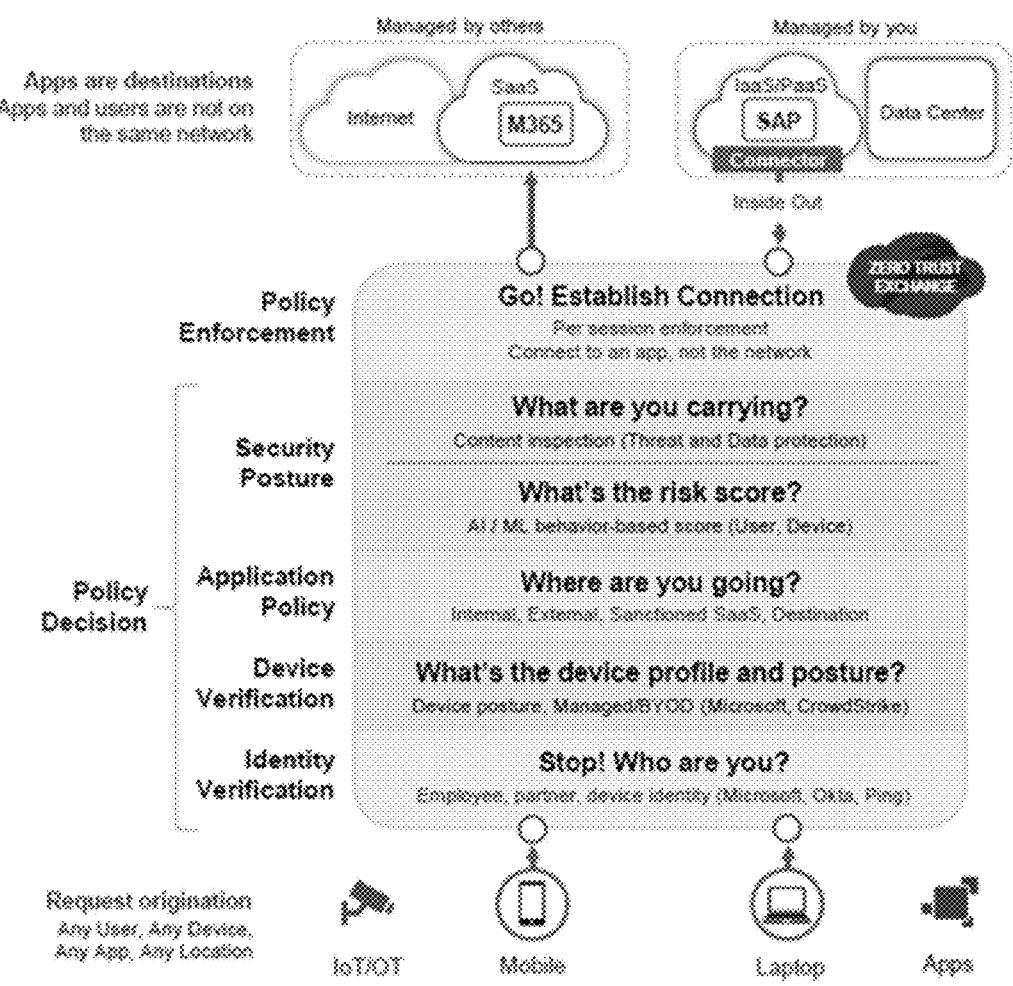
FIG. 1C is a logical diagram illustrating zero trust policies with the cloud-based system and a comparison with the conventional firewall-based approach.
Figure 1C:
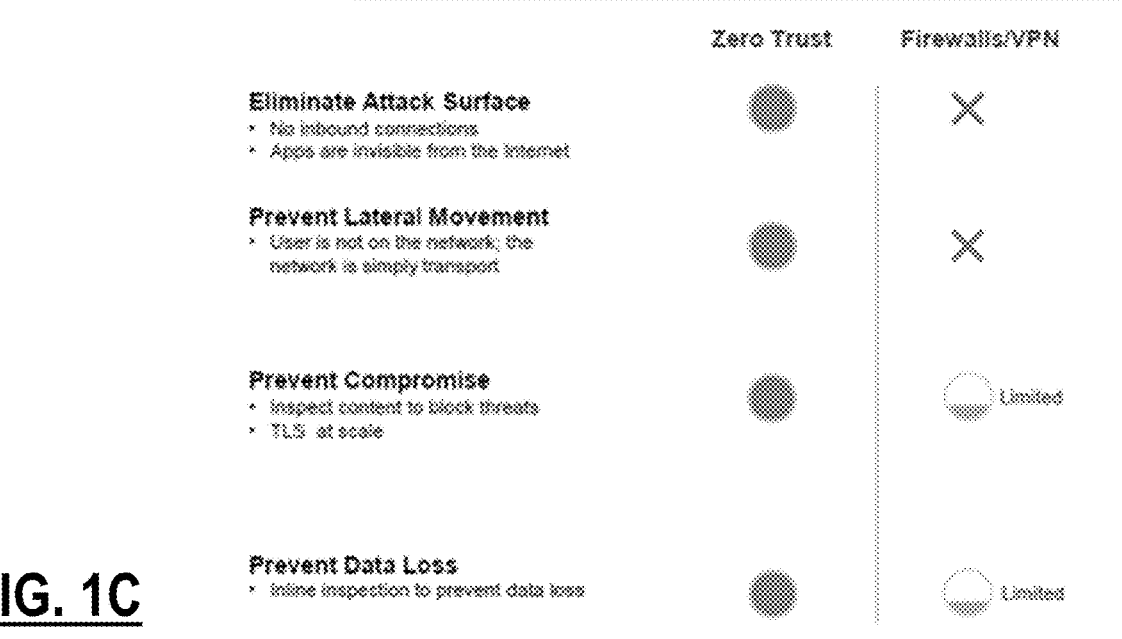

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
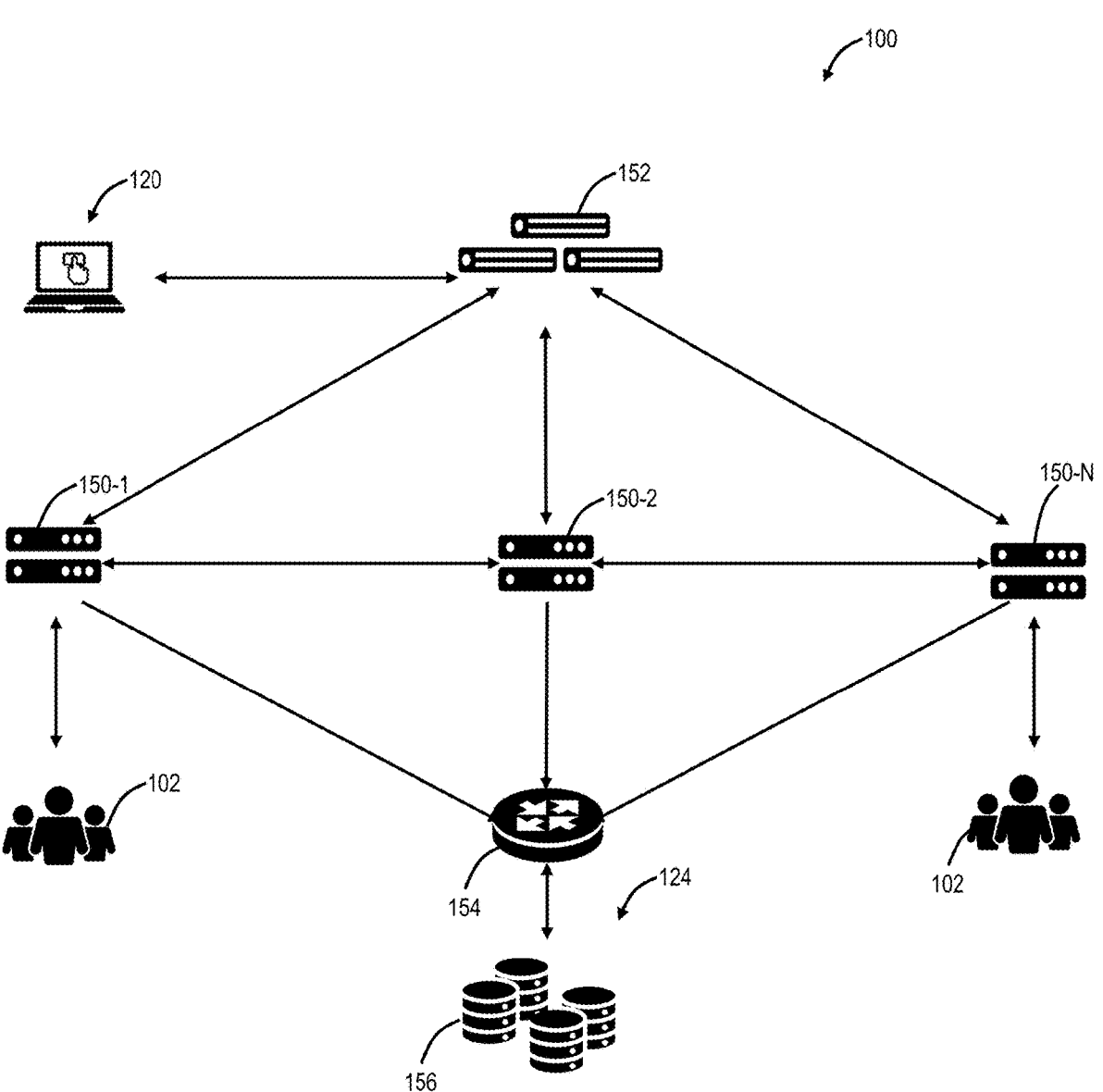
FIG. 2 is a network diagram of an example implementation of the cloud-based system.

FIG. 2 is a network diagram of an example implementation of the cloud-based system 100. In an embodiment, the cloud-based system 100 includes a plurality of nodes (EN) 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
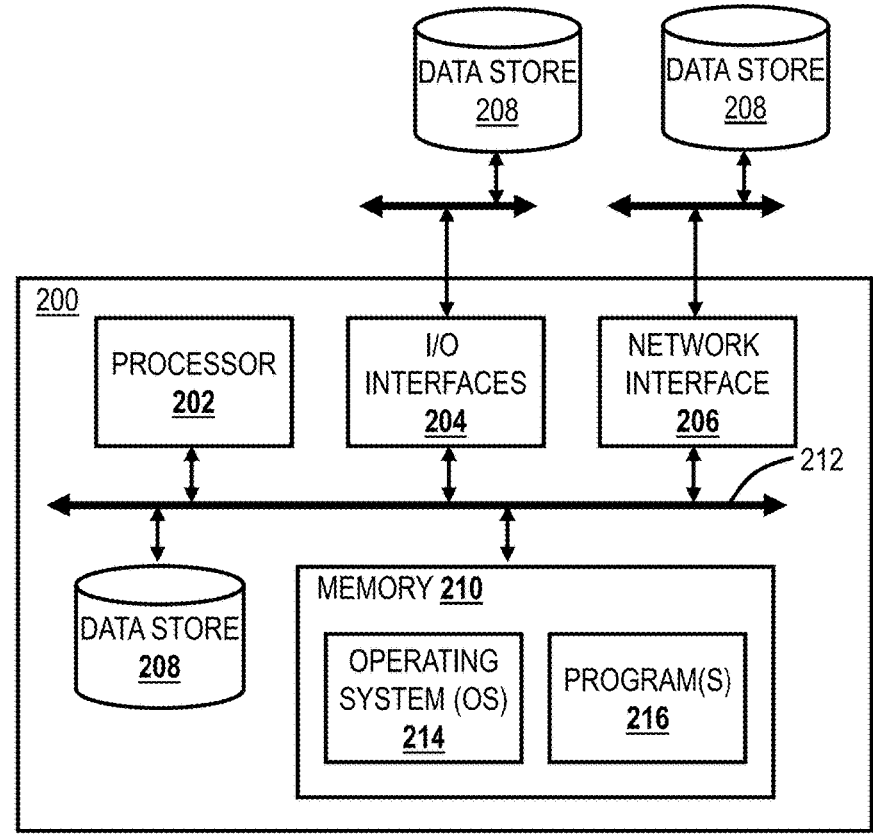
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Tag-Based Policy Enforcement for Dynamic Workloads

At present, tag-based policy enforcement utilizes dynamic address grouping which created groups of IP addresses based on tags. In policies, a "group" is fixed through an expression of tags, e.g., tag1 AND tag2 OR tag3, but the membership to the group is dynamic. These implementations introduce challenges associated with adjusting the group membership, for example, when new resources are added. Traditional methods include polling the tag name and the IP address, building a map, and updating the security policy membership by replacing/adding IP addresses that match the dynamic group definition. This polling and replacement is performed on a polling interval, introducing long latency. Further, the memberships can grow to very large numbers which contribute to scaling issues.

The present disclosure provides a new implementation for tag-based policies in public clouds. Tag-based policy is widely used for handling the dynamic nature of public clouds (e.g. AWS, GCP, Azure, etc.). On-prem in Data Center (DC), the operator would need to order a new server and build the networking with routers and cabling. All of this work takes time and provides an ample buffer for security administrators to update their security policies for any new servers (workloads). In the cloud, workloads are dynamic in nature and can be spun up in seconds based on load balancing, auto scaling, etc. Similarly, with Infrastructure-as-Code (IAC) (e.g. Terraform), new applications can be spun in a matter of seconds. With auto-scaling, new workloads are added or deleted based on the traffic demand. Therefore, IP based network identities can be difficult to use for policy enforcement. Because of these truths, it is expected to be able to use metadata provided by public clouds through "tags" to be used in the policy to identify the workloads instead of specifying a specific IP address.

For utilization of tag-based policy enforcement with the present zero trust architecture, the present systems and methods are contemplated. Traditional methods introduce a number of issues when implemented with the present zero trust architecture. In the case of the cloud-based system 100, pushing all the tags and IP mappings to dynamically adjust the membership of a group is a difficult problem to meet scale, and performance requirements. These traditional methods are essentially out-of-band solutions. The present systems and methods are adapted to provide the IP/tag mapping in-band without changing the MTU size, preserving the performance of transaction. Various embodiments include sending the tags in a packet through an agent on-demand by the enforcement agent called cloud connector in this present system. A cloud connector and a client connector create a DTLS tunnel to a Zero Trust Exchange (ZTE) or central enforcement point. The cloud connector acts as an agent to send the traffic through a tunnel to the ZTE. The protocol only requires to send the version of the tag list with the packet to a node 150 of the cloud-based system 100. If the node doesn't know the tag list of the workload, the system sends a request to the agent to add the tags in a next packet. As an optimization, the systems can always send the tag list in the Transmission Control Protocol (TCP) Synchronize (SYN) packet. Further, in various embodiments, the nodes are adapted to maintain a cache with all the workloads and their respective tag mappings.

In various embodiments, the systems are able to define a rule based on tags associated with workloads on the following policies. These policies include firewall policies, Secure Socket Layer (SSL) inspection, Data Loss Prevention (DLP) URL & cloud apps, Intrusion Prevention System (IPS) control, Network Address Translation (NAT) control, and the like. That is, the systems can define and utilize policies for forwarding workload traffic to the internet based on the tags of workloads.

The following describes various components of the tag-based policy enforcement system.

Tagging Discovery Service (TDS): Responsible for discovering and syncing tags with cloud connectors.

Cloud Connector: Responsible for:

Syncing tags from the tag service and maintaining a table for mapping NameSpace+IP address to a list of tags.

Associating tag list for the given IP address when a packet arrives and applying policies accordingly.

Nodes: Responsible for processing the tags, applying
policies based on tags, logging tags, and forwarding
requests to the internet based on policy found associ-
ated with the tags.

The present systems can include discovering all tags
associated with all resources of a cloud environment, i.e., for
each customer of the cloud-based system 100. Again, these
resources/workloads can be any server, virtual machine,
applications, etc. as mentioned, cloud connectors are
adapted to sync with the TDS in order for each of the cloud
connectors associated with a customer to be kept up to date.
It will be appreciated that a cloud connector can be con-
templated as a type of gateway that sits between a customers
devices, workloads, network, etc. and the cloud-based sys-
tem 100. The cloud connectors can have local databased
associated therewith to store tag and version data of work-
loads locally. Again, this database can be updated periodi-
cally via syncing with the TDS. Once the one or more cloud
connectors have synced with the TDS, responsive to any
workload sending a request through the cloud connector, the
cloud connector is adapted to for ward the request to a node
150 of the cloud-based system 100 along with a version
number of the workload. Based on if the node has tags for
the specific version of the workload, the node can either
request tags from the cloud connector, or apply policy to the
request based on tags persisted at the node 150 for the
workload. For example, if the node 150 has the same version
of tags for the workload persisted in local cache, then the
node does not have to request tags from the cloud connector.
Alternatively, if the node does not have tags which match the
version of the workload, then the node must drop the packet
and request the new version of tags from the cloud connec-
tor. Thus, in a subsequent packet, when the cloud connector
sends the tags and version of the workload, the node can
update its local cache with the new tags and update its
version. Therefore, in any subsequent requests associated
with that workload, the node will have the tags for that
version of the workload, that is, until the workload is
updated and assigned a new version.

With the workload tagging feature, the tag information
associated with a workload in a public cloud syncs between
the tag discovery service and the cloud connectors.

In an embodiment, The node (via one or more tunnel
services) can send an unknown message to the Cloud
Connector, i.e., mark the session. The cloud connector
maintains a session for that 5 tuple, it marks the session as
unknown. In the next packet, all the tags and a version
number of a workload are added in the DTLS tunnel (at most
256 bytes).

In an event that a tag is discovered to have been added/
deleted/modified on an existing resource, the systems can
update as follows. The discovery service detects that a
workload has changed, for example, Workload 1 has tag 1
removed. The discovery service will update the database and
update the version accordingly. The discovery service will
push the new changes to cloud connectors. The cloud
connectors subsequently update their databases. In a next
packet, an associated cloud connector adds the new version.
The node associated with the traffic would receive the
packet, and since it has a cache of a previous version, it
drops the packet and queries the cloud connector for the new
tags.

Figure 5:
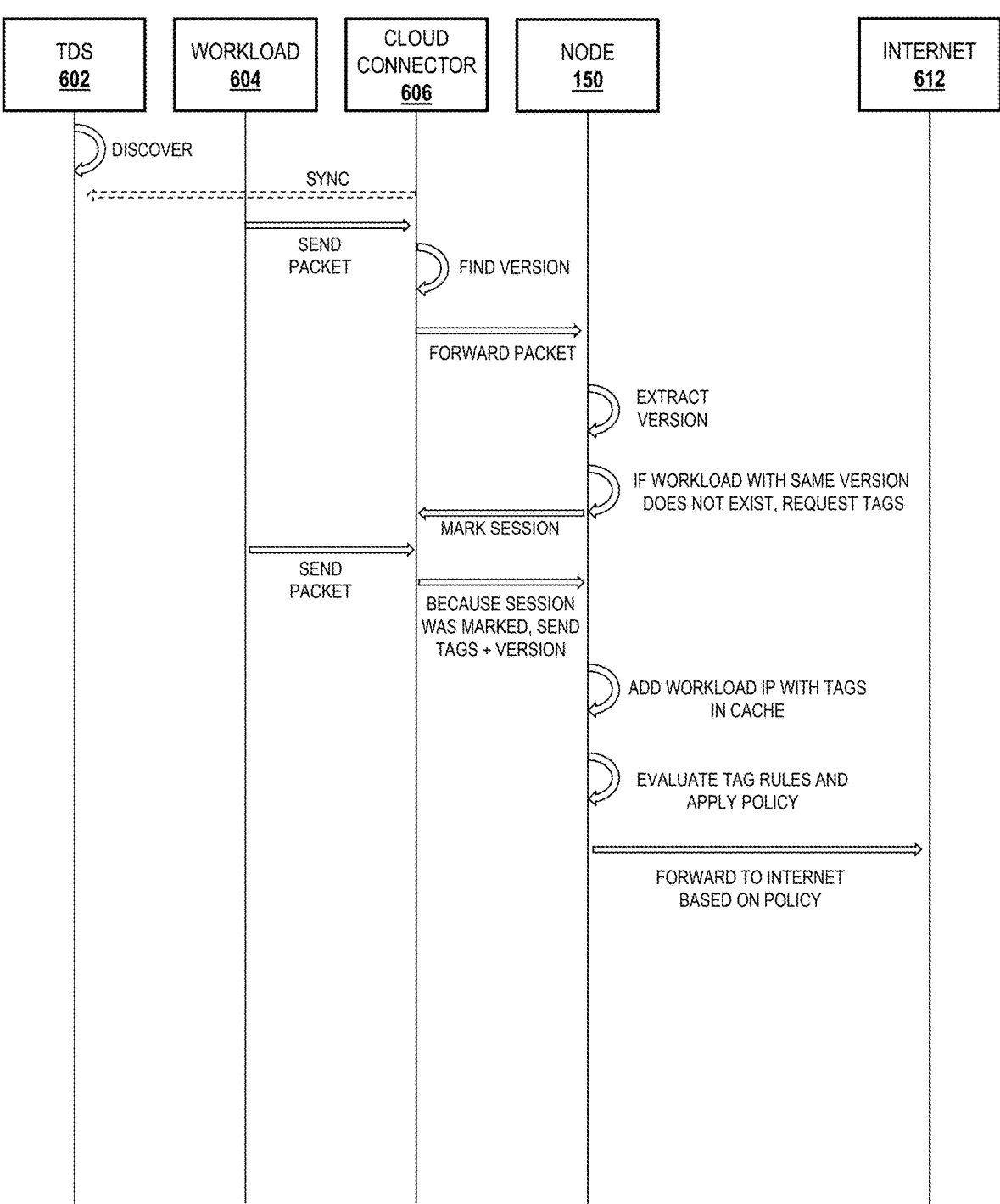
FIG. 5 is a flow diagram of an exemplary use case of the present tag-based policy enforcement for dynamic workloads.

FIG. 5 is a flow diagram of an exemplary use case of the
present tag-based policy enforcement for dynamic work-
loads/resources. In various embodiments, a tag discovery
service (TDS) 602 is configured to discover namespace and
tags associated with workload 604 IP addresses. The TDS

14

602 and various cloud connectors 606 associated with
various tenants of the cloud-based system 100 are adapted to
sync tags periodically and maintain namespace and IP
addresses to a tag list table. The tag list table being persisted
in one or more databases, each associated with a tenant of
the cloud-based system. Responsive to the workload 604
sending a packet to a cloud connector 606 associated with a
tenant, the cloud connector 606 is adapted to find workload
tags and version number for the given IP address and
namespace of the workload 604. If this is the first packet for
the session, the cloud connector 606 is adapted to flag the
session to send tags until the flag is cleared. The cloud
connector 606 is then adapted to forward the packet with the
version of the workload to the node 150. The node 150 then
extracts the version, and if the node, within its cache/
database does not have a matching version number for the
workload, the node marks the session for the cloud connec-
tor 606. The workload 604 will then send another packet due
to the first packet not being processed. The cloud connector
606 is then adapted to, because the session was marked, send
the tags and the version number of the workload to the node
150. The node is then adapted to add the workload IP with
its tags in its cache, and update its version number within its
cache. The node can then evaluate tag rules and enforce
policy before forwarding the request to the internet 612
based on the policy.

Figure 6:
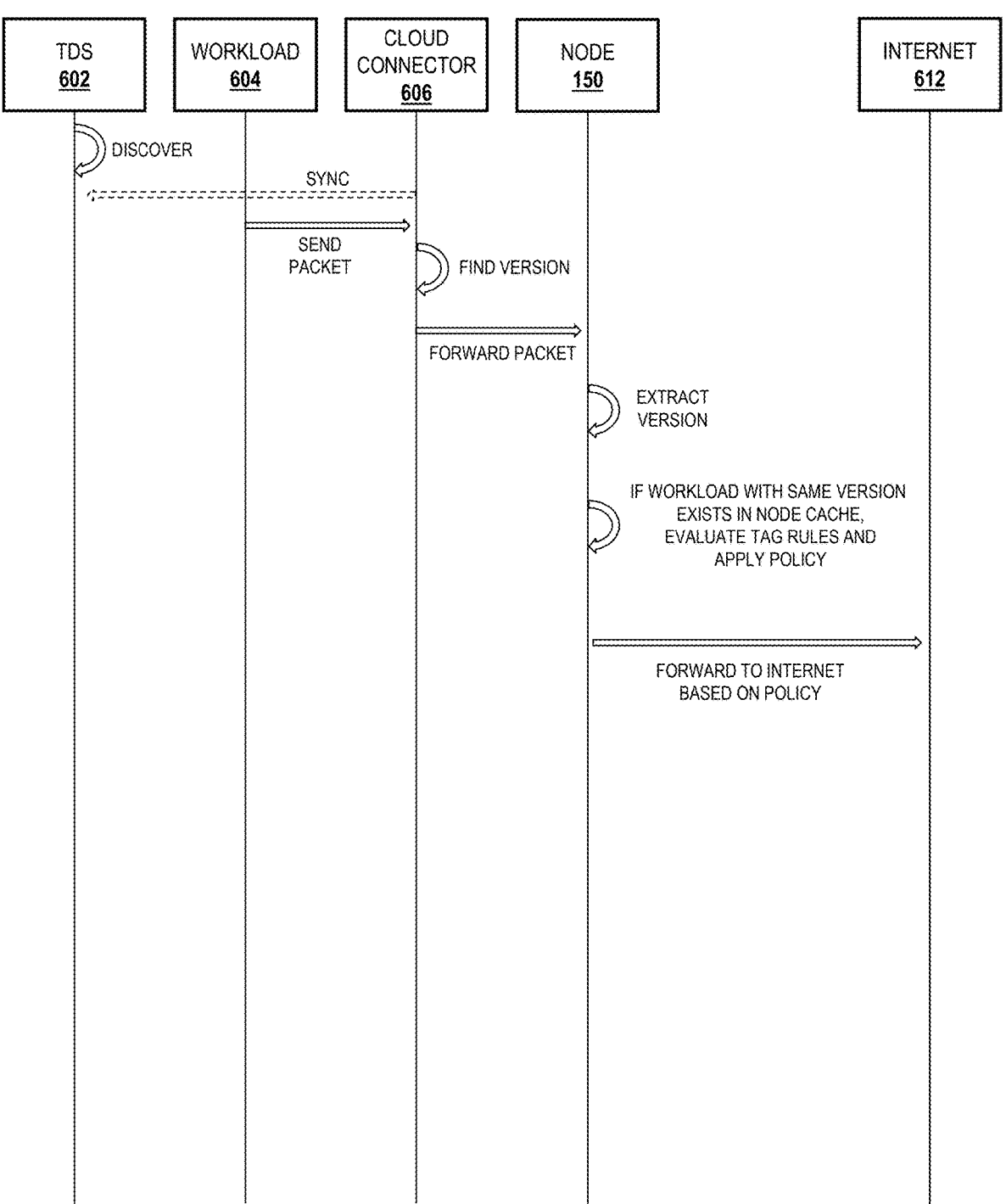
FIG. 6 is a flow diagram of another exemplary use case of the present tag-based policy enforcement for dynamic workloads.

FIG. 6 is a flow diagram of an exemplary use case of the
present tag-based policy enforcement for dynamic work-
loads when a node has tag data persisted for the current
version of a workload. Similar to the process shown in FIG.
7, responsive to the workload 604 sending a packet to a
cloud connector 606 associated with a tenant, the cloud
connector 606 is adapted to find workload tags and version
number for the given IP address and namespace of the
workload 604. If this is the first packet for the session, the
cloud connector 606 is adapted to flag the session to send
tags until the flag is cleared. The cloud connector 606 is then
adapted to forward the packet with the version of the
workload to the node 150. The node 150 then extracts the
version, and if the node, within its cache/database, has a
matching version of the workload, it can extract the tags
from the cache, and the node 150 evaluates tag rules and
applies tag policies to the traffic associated with the work-
load 604. The node 150 then forwards the packet to the
internet 612 based on the policy.

That is, the TDS is adapted to scan customer accounts
which include various workloads. The scanning is per-
formed to discover all tags associated with the workloads.
Based on a workload sending traffic (packet) to a cloud
connector, the cloud connector will forward the traffic to a
node 150 of the cloud-based system 100 based on any of
load balancing, geolocation, etc. If this is a new workload as
described herein, the node will identify this because the node
will not have seen traffic from this workload before. Based
on this, the packet is dropped, and a packet is sent back to
the cloud connector stating that the node cannot map this
resource to a policy. The cloud connector then sends another
packet to the node which includes the tags and version of the
workload. The node is then adapted to persist this tag data
of the workload for future use. This process can be per-
formed at each node 150 of the cloud-based system 100
based on the node interacting with this resource for the first
time. Once the node 150 has persisted tag data of the
workload, the node can perform rule lookup based on the
tags and enforce policy on the traffic. Because of this, tag
data does not have to be sent with each packet, as it is
traditionally done. Additionally, in various embodiments, when TCP is used, the Maximum Transmission Units (MTU) are not affected by the present methods because the tags are transmitted within the TCP SYN packet, and no tags are sent in future packets because of the nodes adaptation to persist tag data for workloads.

Process for Tag-Based Policy Enforcement for Dynamic Workloads

Figure 7:
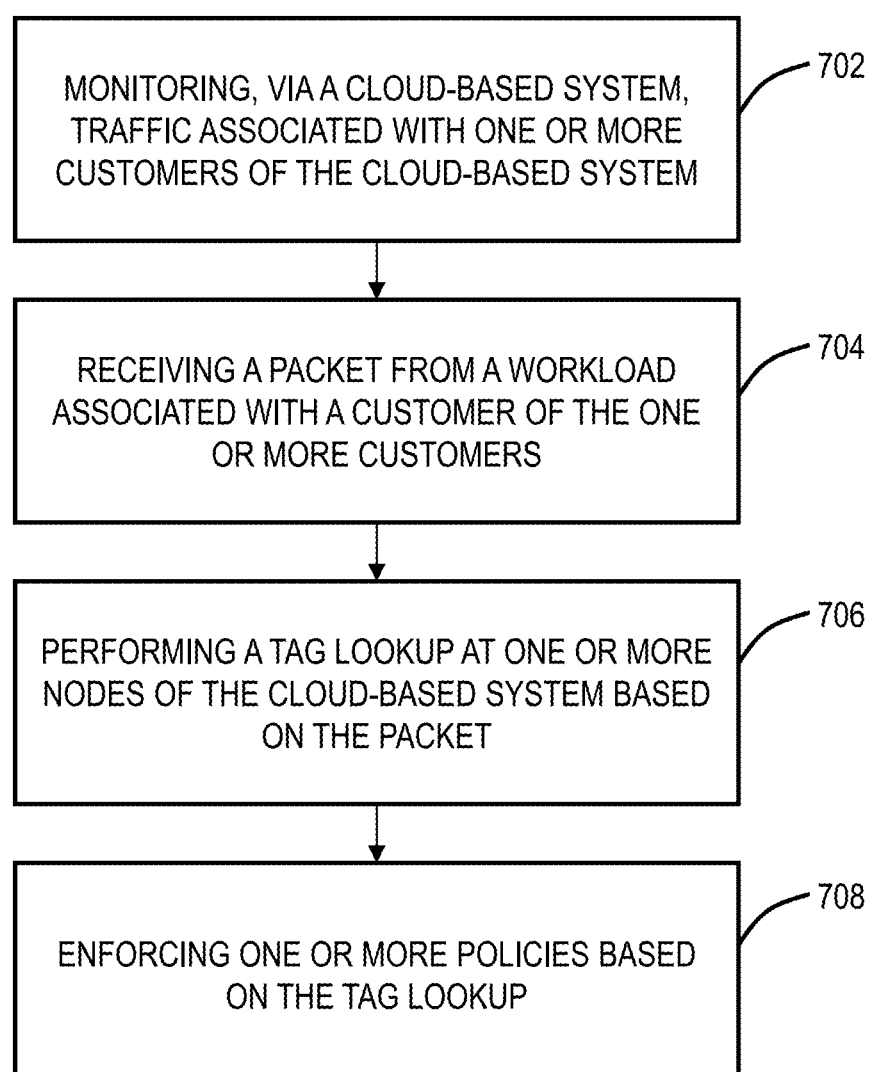
FIG. 7 is a flow chart of a process for enforcing tag-based policy on dynamic workloads.

FIG. 7 is a flow chart of a process for enforcing tag-based policy on dynamic workloads. The process 700 includes monitoring, via a cloud-based system, traffic associated with one or more customers of the cloud-based system (step 702); receiving a packet from a workload associated with a customer of the one or more customers (step 704); performing a tag lookup at one or more nodes of the cloud-based system based on the packet (step 706); enforcing one or more policies based on the tag lookup (step 708).

The process 700 can further include the steps of performing a policy lookup based on tags discovered during the tag lookup, wherein the enforcing is performed based thereon. The tag lookup, the policy lookup, and the enforcing can be performed at the one or more nodes of the cloud-based system. The steps can further include discovering all tags associated with all workloads of the customer. The steps can further include synchronizing discovered tags with one or more cloud connectors of the cloud-based system, wherein the one or more cloud connectors are communicatively coupled to the one or more nodes of the cloud-based system. Based on no tags being found for the workload during the tag lookup at the one or more nodes, the steps can further include: dropping the packet; querying the one or more cloud connectors for workload information; and receiving, in a next packet, all tags and a version associated with the workload. The steps can further include storing the received tags and version associated with the workload at the one or more nodes. The tags and version associated with the workload can be received from the one or more cloud connectors via transmission of a Transmission Control Protocol (TCP) Synchronization (SYN) packet. Responsive to identifying a modification of one or more tags of the workload, the steps can further include updating a database and a version of the workload based thereon. Based on identifying a new version number of the workload during the tag lookup at the one or more nodes, the steps can further include: dropping the packet; querying the one or more cloud connectors for new workload information; and receiving, in a next packet, all tags and the new version associated with the workload.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method for tag based policy enforcement for dynamic cloud comprising steps of:
   monitoring, via a cloud-based system, traffic associated with one or more customers of the cloud-based system;
   discovering all tags associated with all workloads of a customer from the monitored one or more customers;
   synchronizing discovered tags with one or more cloud connectors of the cloud-based system, wherein the one or more cloud connectors are communicatively coupled to the one or more nodes of the cloud-based system;
   receiving a packet from a workload associated with one of the monitored one or more customers;
   performing a tag lookup from the discovered all tags at the one or more nodes of the cloud-based system based on the received packet; and
   enforcing one or more policies based on the performed tag lookup.

2. The method of claim 1, wherein the steps further comprise:
   performing a policy lookup based on tags discovered during the tag lookup, wherein the enforcing is performed based thereon.

3. The method of claim 2, wherein the tag lookup, the policy lookup, and the enforcing are performed at the one or more nodes of the cloud-based system.

4. The method of claim 1, wherein based on no tags being found for the workload during the tag lookup at the one or more nodes, the steps further comprise:
  dropping the packet;
  querying the one or more cloud connectors for workload information; and
  receiving, in a next packet, all tags and a version associated with the workload.
5. The method of claim 4, wherein the steps further comprise:
  storing the received tags and version associated with the workload at the one or more nodes.
6. The method of claim 4, wherein the tags and version associated with the workload are received from the one or more cloud connectors via transmission of a Transmission Control Protocol (TCP) Synchronization (SYN) packet.
7. The method of claim 1, wherein responsive to identifying a modification of one or more tags of the workload, the steps further comprise:
  updating a database associated with one or more cloud connectors with modified tags and a version of the workload based thereon.
8. The method of claim 7, wherein based on identifying a new version number of the workload during the tag lookup at the one or more nodes, the steps further comprise:
  dropping the packet;
  querying the one or more cloud connectors for new workload information; and
  receiving, in a next packet, all tags and the new version associated with the workload.
9. A non-transitory computer-readable medium comprising instructions for tag-based policy enforcement for dynamic cloud, that, when executed, cause one or more processors to perform steps of:
  monitoring, via a cloud-based system, traffic associated with one or more customers of the cloud-based system;
  discovering all tags associated with all workloads of a customer from the monitored one or more customers;
  synchronizing discovered tags with one or more cloud connectors of the cloud-based system, wherein the one or more cloud connectors are communicatively coupled to the one or more nodes of the cloud-based system;
  receiving a packet from a workload associated with a customer of the monitored one or more customers;
  performing a tag lookup from the discovered all tags at the one or more nodes of the cloud-based system based on the received packet; and enforcing one or more policies based on the performed tag lookup.
10. The non-transitory computer-readable medium of claim 9, wherein the steps further comprise:
  performing a policy lookup based on tags discovered during the tag lookup, wherein the enforcing is performed based thereon.
11. The non-transitory computer-readable medium of claim 10, wherein the tag lookup, the policy lookup, and the enforcing are performed at the one or more nodes of the cloud-based system.
12. The non-transitory computer-readable medium of claim 9, wherein based on no tags being found for the workload during the tag lookup at the one or more nodes, the steps further comprise:
  dropping the packet;
  querying the one or more cloud connectors for workload information; and
  receiving, in a next packet, all tags and a version associated with the workload.
13. The non-transitory computer-readable medium of claim 12, wherein the steps further comprise:
  storing the received tags and version associated with the workload at the one or more nodes.
14. The non-transitory computer-readable medium of claim 12, wherein the tags and version associated with the workload are received from the one or more cloud connectors via transmission of a Transmission Control Protocol (TCP) Synchronization (SYN) packet.
15. The non-transitory computer-readable medium of claim 9, wherein responsive to identifying a modification of one or more tags of the workload, the steps further comprise:
  updating a database associated with one or more cloud connectors with modified tags and a version of the workload based thereon.
16. The non-transitory computer-readable medium of claim 15, wherein based on identifying a new version number of the workload during the tag lookup at the one or more nodes, the steps further comprise:
  dropping the packet;
  querying the one or more cloud connectors for new workload information; and
  receiving, in a next packet, all tags and the new version associated with the workload.

* * * * *